US012679600B2

(12) United States Patent
Tong et al.

(10) Patent No.: US 12,679,600 B2
(45) Date of Patent: Jul. 14, 2026

(54) ANTI-TAMPERING CONTAINER

(71) Applicant: Logistics and Supply Chain MultiTech R&D Centre Limited, Pok Fu Lam (HK)

(72) Inventors: Chi Hung Tong, Pok Fu Lam (HK); Tik Sze Wai, Pok Fu Lam (HK); Ka Lun Fan, Pok Fu Lam (HK); Kwong Yeung Simon Wong, Pok Fu Lam (HK)

(73) Assignee: Logistics and Supply Chain MultiTech R&D Centre Limited, Pok Fu Lam (HK)

( * ) Notice: Subject to any disclaimer, the term of this patent is extended or adjusted under 35 U.S.C. 154(b) by 538 days.

(21) Appl. No.: 18/041,115

(22) PCT Filed: Aug. 14, 2020

(86) PCT No.: PCT/CN2020/109254

§ 371 (c)(1),
(2) Date: Feb. 9, 2023

(87) PCT Pub. No.: WO2022/032653

PCT Pub. Date: Feb. 17, 2022

(65) Prior Publication Data

US 2023/0286702 A1 Sep. 14, 2023

(51) Int. Cl.

| | |
|---|---|
| ***B65D 33/34*** | (2006.01) |
| ***B65D 33/25*** | (2006.01) |
| ***B65D 65/40*** | (2006.01) |
| ***B65D 81/38*** | (2006.01) |
| ***G08B 13/12*** | (2006.01) |

(52) U.S. Cl.
CPC ............ *B65D 33/34* (2013.01); *B65D 33/25* (2013.01); *B65D 65/40* (2013.01); *B65D 81/3888* (2013.01); *G08B 13/12* (2013.01)

(58) Field of Classification Search
CPC ........ B65D 33/34; B65D 33/25; B65D 65/40; B65D 81/3888; B65D 2401/00; G08B 13/12
USPC .......................................................... 116/85
See application file for complete search history.

(56) References Cited

U.S. PATENT DOCUMENTS

| | | | | |
|---|---|---|---|---|
| 5,858,500 A * | 1/1999 | MacPherson | ............ | E05G 1/14 340/568.1 |
| 2017/0011667 A1* | 1/2017 | Sanchez | .................... | A61J 1/03 |
| 2019/0009957 A1* | 1/2019 | Stuckey | ............ | G06K 19/0772 |

(Continued)

FOREIGN PATENT DOCUMENTS

| | | |
|---|---|---|
| CN | 105523276 | 4/2016 |
| CN | 207141844 | 3/2018 |
| CN | 109216287 | 1/2019 |

(Continued)

*Primary Examiner* — Kristina M Deherrera
*Assistant Examiner* — Evan Mancini
(74) *Attorney, Agent, or Firm* — Renner, Kenner, Greive, Bobak, Taylor & Weber

(57) ABSTRACT

An anti-tampering container comprising a container arranged to contain an object; an enclosure arranged to lock and seal the container in an enclosed state so as to prevent an access of the object contained in the container; and a detection module including an anti-tampering arrangement arranged to detect tampering of the enclosed state of the container, and to provide a notification of the tampering being detected.

27 Claims, 4 Drawing Sheets

(56) References Cited

U.S. PATENT DOCUMENTS

| | | | | |
|---|---|---|---|---|
| 2019/0205581 | A1* | 7/2019 | Forster | G06K 19/0723 |
| 2020/0357262 | A1* | 11/2020 | Walsh | G01R 31/54 |

FOREIGN PATENT DOCUMENTS

| | | |
|---|---|---|
| CN | 108369769 | 11/2019 |
| CN | 110636977 | 12/2019 |

* cited by examiner

ANTI-TAMPERING CONTAINER

TECHNICAL FIELD

The present invention relates to an anti-tampering container, and particularly, although not exclusively, to an anti-tampering bag.

BACKGROUND

Transportation of items, especially articles or documents including sensitive information or secrets, may be sealed and protected by secure storage/carrying container. For example, secure containers may include a one-time physical seal, or electronic seal mounted at the container-cover lock such that the items are securely locked and sealed in the container until the physical seal is removed or unlocked.

However, the container-cover lock or seal cannot protect against damages of the container at the position other than the container-cover lock part. In this case, the item(s) inside the secure container will be exposed to mischievous will, and the recipient of the item(s) may only know the tampering of the container after the receipt of the item and the damaged container.

SUMMARY OF THE INVENTION

In accordance with a first aspect of the present invention, there is provided an anti-tampering container comprising: a container arranged to contain an object; an enclosure arranged to lock and seal the container in an enclosed state so as to prevent an access of the object contained in the container; and a detection module including an anti-tampering arrangement arranged to detect tampering of the enclosed state of the container, and to provide a notification of the tampering being detected.

In an embodiment of the first aspect, the anti-tampering arrangement comprises an electrical circuit in connection with the detection module.

In an embodiment of the first aspect, the anti-tampering arrangement includes an electrical switch in connection with the electrical circuit, and wherein the electrical switch is arranged to be actuated by the enclosure.

In an embodiment of the first aspect, the detection module is arranged to detect tampering of the enclosed state by detecting a change of state of the electrical switch.

In an embodiment of the first aspect, the enclosure includes a closable flap connected to the container, and wherein the closable flap depresses the electrical switch when the container is in the enclosed state.

In an embodiment of the first aspect, the enclosure further includes a securing means arranged to secure the position of the closable flap when the container is in the enclosed state.

In an embodiment of the first aspect, the securing means includes at least one locking pin.

In an embodiment of the first aspect, the anti-tampering arrangement includes an electrical conductive member disposed on a substantial portion of a body of the container.

In an embodiment of the first aspect, the electrical conductive member is arranged to form at least partially the electrical circuit.

In an embodiment of the first aspect, the detection module is arranged to detect tampering of the enclosed state by detecting a change of state of the electrical conductive member.

In an embodiment of the first aspect, the change of state of the electrical conductive member includes a change of electrical connectivity of the electrical conductive member.

In an embodiment of the first aspect, the change of state of the electrical conductive member includes a change of electrical parameter of the electrical conductive member.

In an embodiment of the first aspect, the electrical conductive member includes at least one electrical wire embedded or attached to the body of the container.

In an embodiment of the first aspect, the at least one electrical wire is arranged to form at least one electrical conductive path connectable to the detection module.

In an embodiment of the first aspect, the detection module is arranged to connect to a single electrical conductive path defined by a plurality of electrical wires.

In an embodiment of the first aspect, the anti-tampering arrangement includes a first electrical wire defining a first group of parallel sections arranged in a first direction, wherein the first group of parallel sections covers at least one surface defined on the body of the container.

In an embodiment of the first aspect, the anti-tampering arrangement includes a second electrical wire defining a second group of parallel sections arranged in a second direction different from the first direction, wherein the second group of parallel sections covers the at least one surface defined on the body of the container.

In an embodiment of the first aspect, the first group of parallel sections at least partially intersects with the second group of parallel sections.

In an embodiment of the first aspect, the first group of parallel sections and the second group of parallel sections combine to define a cross pattern.

In an embodiment of the first aspect, the first group of parallel sections are electrically isolated from the second group of parallel sections at the intersections defined by the first electrical wire and the second electrical wire.

In an embodiment of the first aspect, the first electrical wire and the second electrical wire are electrically connected in series.

In an embodiment of the first aspect, the detection module electrically connects to a plurality of terminals of the at least one electrical wire.

In an embodiment of the first aspect, the container comprises at least one piece of material sheet defining the body of the container.

In an embodiment of the first aspect, the at least one piece of material sheet defines at least a front face and the rear face of the body of the container.

In an embodiment of the first aspect, the container comprises a first sheet of fabric wrapping around two opposite side portions of the body of the container, and a second sheet of fabric wrapping around a bottom portion of the body of the container.

In an embodiment of the first aspect, the container further comprises an insulating layer sandwiched between the first sheet of fabric and the second sheet of fabric.

In an embodiment of the first aspect, the enclosure is arranged to close an opening defined at a top portion of the body of the container so as to seal the container.

In an embodiment of the first aspect, the container is a bag.

In an embodiment of the first aspect, the detection module is fixedly connected to the enclosure.

In an embodiment of the first aspect, the detection module comprises a communication module arrange to provide a notification of the tampering being detected.

In an embodiment of the first aspect, the communication module includes a Bluetooth communication module.

In an embodiment of the first aspect, the communication module includes a BLE beacon.

In an embodiment of the first aspect, the anti-tampering container further comprises an external BLE reader arranged to monitor a status of the container.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
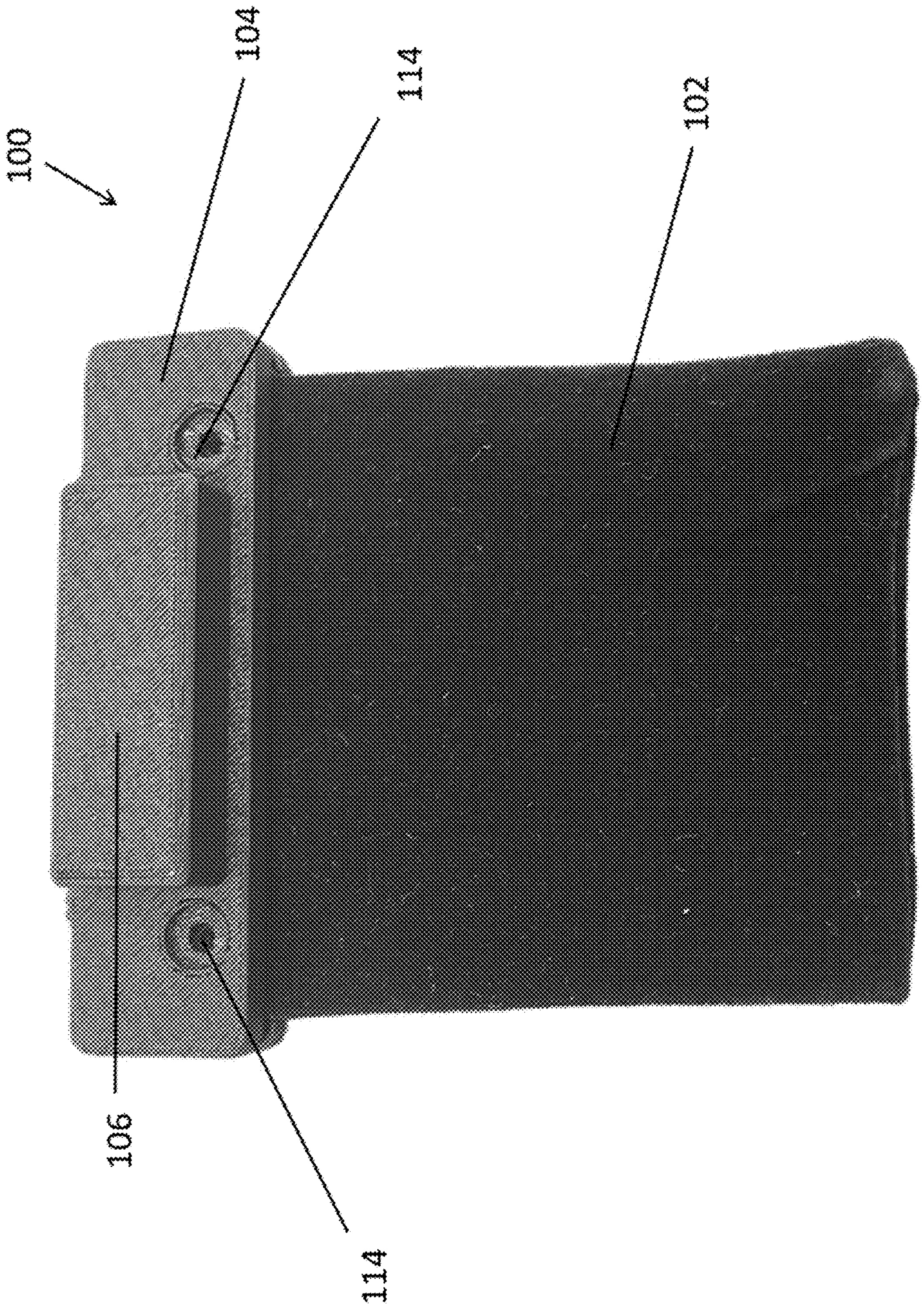
FIG. 1 is an image showing a front view of an anti-tampering container in accordance with one embodiment of the present invention.

With reference to FIG. 1, there is shown an embodiment of an anti-tampering container 100 comprising: a container 102 arranged to contain an object; an enclosure 104 arranged to lock and seal the container 102 in an enclosed state so as to prevent an access of the object contained in the container 102; and a detection module 106 including an anti-tampering arrangement arranged to detect tampering of the enclosed state of the container 102, and to provide a notification of the tampering being detected.

In this example, the anti-tampering container 100 includes substantially two main parts including a bag 102 a closable flap 104 which may be used to selectively close the opening of the bag 102. In addition, by including an anti-tampering arrangement in either one or both of the bag 102 and the closable flap 104, the integrity of the content being enclosed and sealed within the container 102 may be maintained.

Referring to FIG. 1, the bag 102 is made of a fabric material which is flexible and may accommodate one or more items of various shapes. Edges of the fabric material on different faces, e.g. the front and the rear faces or surfaces may be seamlessly combined together with stiches such that the items enclosed in the bag 102 is inaccessible via these edges. Alternatively other fastening means such as staples or adhesives may be applied to combines the material on difference surfaces at the edges.

The edges on opposite side portions, as well as the bottom portion are combined and sealed to form the bag 102, with an opening defined at the top portion, and the opening may be selectively closed and sealed by the enclosure 104 attached to the bag 102. In this embodiment, the enclosure 104 includes a pair of plates sandwiching the opening of the bag 102 at the top portion so as to close the opening of the bag 102. In addition, the enclosure 104 is further provided with a detection module 106 which may detect and/or monitor the status of the enclosure 104 and/or the integrity of the bag 102.

In some alternative embodiments, the bag or the container body may be made of other flexible materials, such as but not limited to paper and flexible polymer, or the container may be provided as a box made of relatively rigid material such as wood or plastic. The material for making the container body is preferably an electrically insulating material.

By including a detection module to detect the status of the enclosed status of the bag 102, the detection module 106 may actively and immediately notify an owner or a recipient of the item enclosed within the anti-tampering bag 100, upon detecting one or more tampering condition, such as an unauthorized opening of the enclosure 104 and/or a physical damage of the enclosure 104 or the bag 102.

The detection module 106 may include necessary electrical and/or electronic components (e.g. sensors and communication modules) to perform the detection and communication function as described above, and are preferably housed within a cavity defined in an interior of the enclosure, as explained in further details as follows.

Figures 2A, 2B:
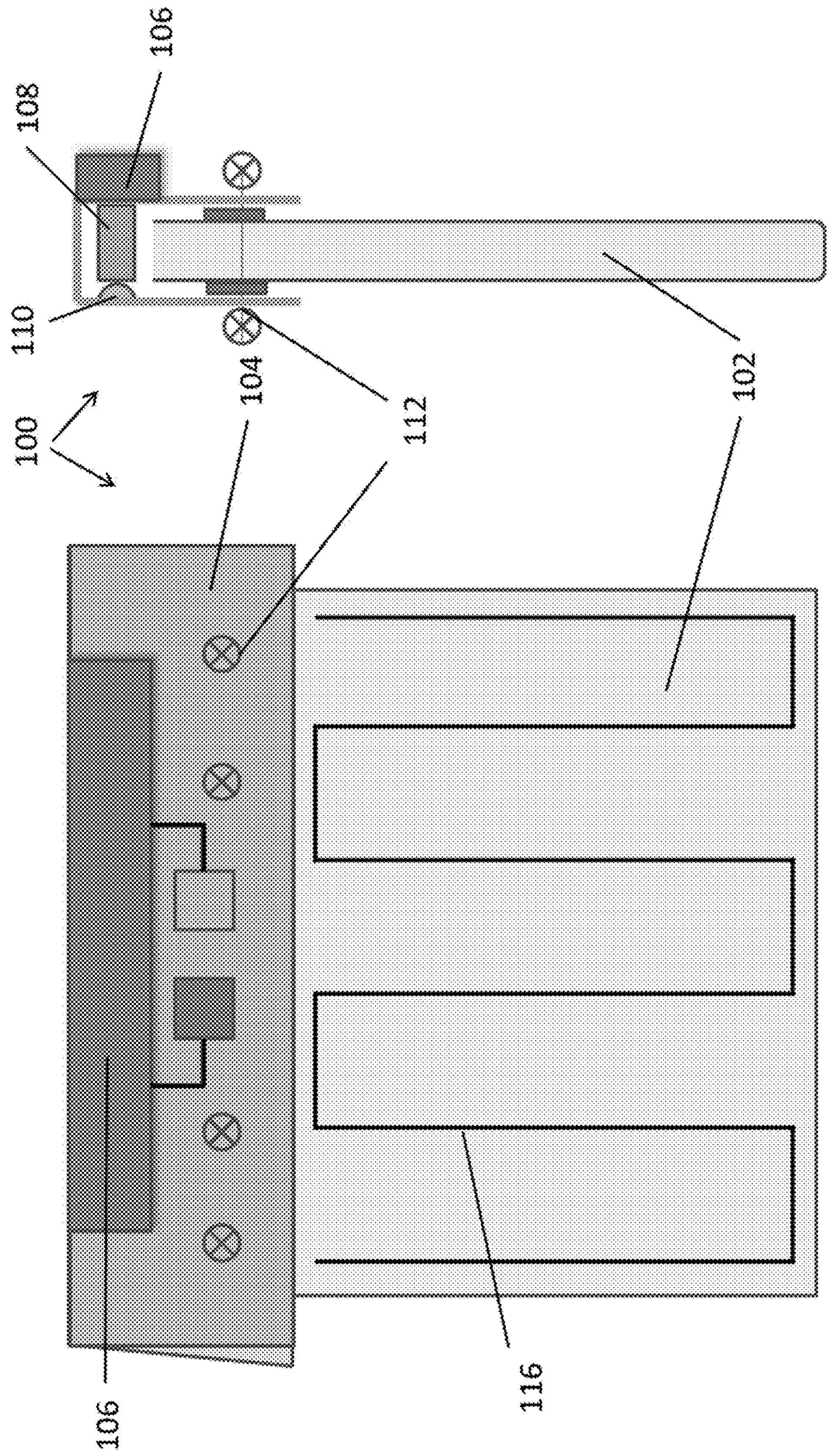
FIGS. 2A and 2B are schematic diagrams showing respectively a front view and a side view of the anti-tampering container of FIG. 1.

With reference also to FIG. 2A and FIG. 2B, the detection module 106 is fixedly connected to the enclosure 104 such that it may monitor the configuration of the enclosure 104 as well as the container 102 attached to the enclosure 104, and by utilizing an anti-tampering arrangement provided in the anti-tampering bag/container 100, unauthorized access of items stored within the container 102 may be prevented when the container 102 is locked in an enclosed state. Preferably, the anti-tampering arrangement comprises an electrical circuit in connection with the detection module 106.

In this example, the enclosure 104 includes a closable flap 104 connected to the container 102, and the flap 104 includes an electrical switch 108 provided in an internal surface of the flap 104 which may be actuated by the enclosure 104 when the flap 104 is moved to the close position as shown in FIG. 2B. For example, with a protrusion 110 positioned opposite to the switch 108 fixed on the flap 104, the closable flap 104 depresses the electrical switch 108 when the flap 104 is closed, and when the flap 104 is opened, the electrical switch 108 is released and is not actuated. By detecting a change of state of the electrical switch 108, the detection module 106 may monitor the open/close status of the flap 104, as well as any tampering of the enclosed state.

Optionally or additionally, the enclosure 104 further includes a securing means arranged to secure the position of the closable flap 104 when the container 102 is in the enclosed state. For example, referring to FIG. 2A, four locking pins 112 which protrudes across the opposite outer surface of the closable flap 104 is used to fix the position of the flap 104 so as to prevent the flap 104 being opened accidentally. With reference to FIG. 1, the pins may penetrate through respective apertures 114 defined on the closing flap 104 and/or the bag 102.

Alternatively or optionally, different numbers of locking pins, or other securing means, such as buttons, clips or magnets, may be used to replace or with the locking pins to provide the require securing function.

Preferably, the anti-tampering arrangement may further include an electrical conductive member disposed on a substantial portion of a body of the container 102, so as to allow the detection module 106 to determine if the container or the fabric bag 102 in FIG. 1 has been tampered, which may indicates that the items originally sealed in the container 102 may have been exposed.

For example, the electrical conductive member includes an electrical wire 116 being embedded in or attached to the body of the container 102, such as the fabric material that forms the body of the bag 102. Referring to FIG. 2A, the electrical wire 116 may run throughs the entire (inner) surface of the bag 102 in a manner similar to an electric blanket, in which multiple parallel sections covering sequential portions of the surface. The terminal ends of the electrical wire 116 may be connected to the detection module 106 such that the integrity of body of the container 102 may be monitored with to the status of the electrically conductive path formed by the electrical wire 116.

Preferably, the electrical circuit that allows monitoring of the open/close status of the flap 104 using the electrical switch 108 may be logically similar to monitoring tampering of the body of the container 102 using the conductive wire 116, in which both require a monitoring of opening or closing of the electric circuit form by respectively the switch 108 or the electrical wire 116. In one example operation, a change of electrical connectivity of the wire 116, such as changing from conductive to disconnected, may indicate that the body of the bag 102 may be damaged.

Similar to the sensing of the flap 104 being opened or close, the detection module 106 may detect tampering of the enclosed state by detecting a change of state of the electrical conductive member associated with the fabric material or the body of the container. Alternatively, the detection module 106 may employ other sensing methods to determine tampering of the bag 102, including determining other electrical parameter of the electrical conductive member disposed on/in or integrated with the fabric. For example, other parameters such as electrical resistance, capacitance and inductance may be obtained instead for determining the integrity of the body of the bag 102, based on a change of any of these values detectable by the detection module 106.

Preferably, the electrical wire 116 may be routed to cover more than a single face or surface defined by the container body. For example, a single wire 116 may be arranged to run through both the rear surface and the front surface such that the integrity of both the front and the back of the bag 102 may be monitored. Alternatively multiple individual wires may be employed to form separate circuits connected separately to the detector module.

In yet another preferred embodiment, a single conductive path may be defined by connecting a plurality of wires in series connection, such that the detection module 106 may determine a tampering of the enclosed status when any part of the conductive path defined by the plurality of wires is damaged.

Figure 3B:
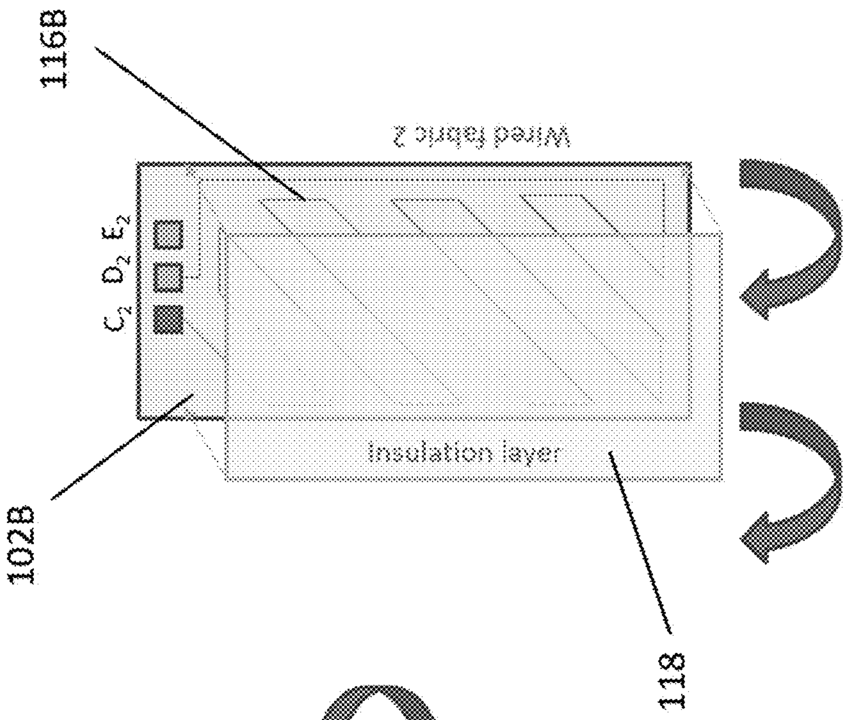
FIGS. 3A and 3B are schematic diagrams showing respectively a first sheet of fabric and a second sheet of fabric both embedded with electrical wire, and the two sheets of fabric combines to define the body of the container body of the tampering container of FIG. 1.
Figure 3A:
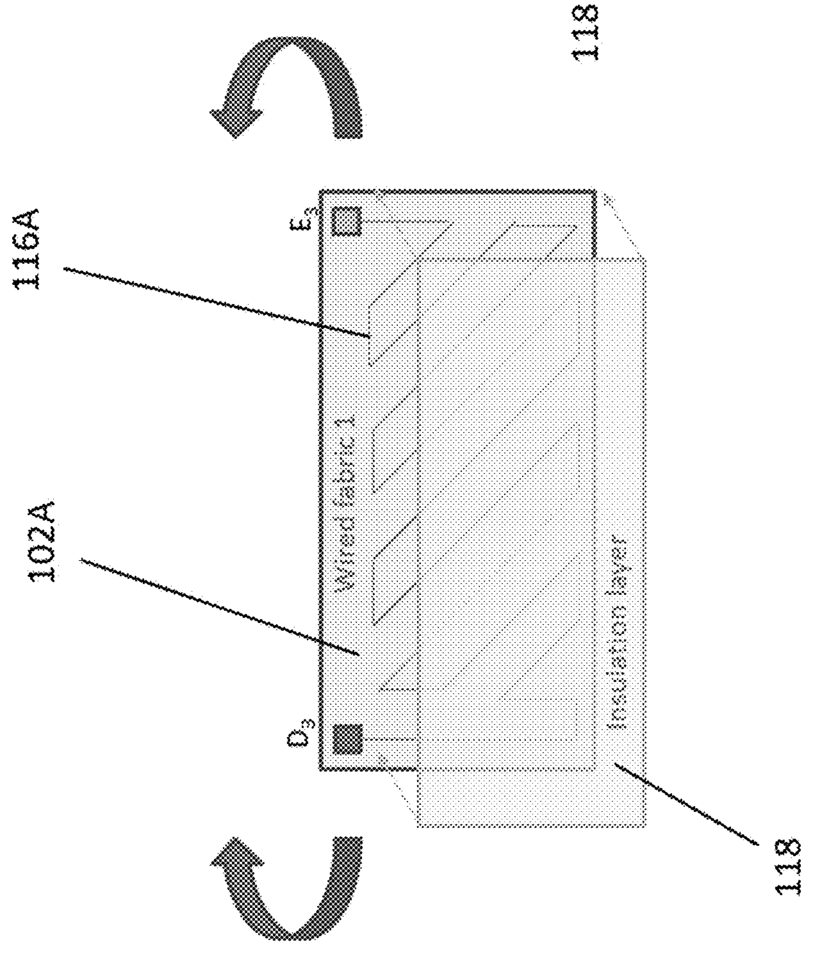
Figure 3C:
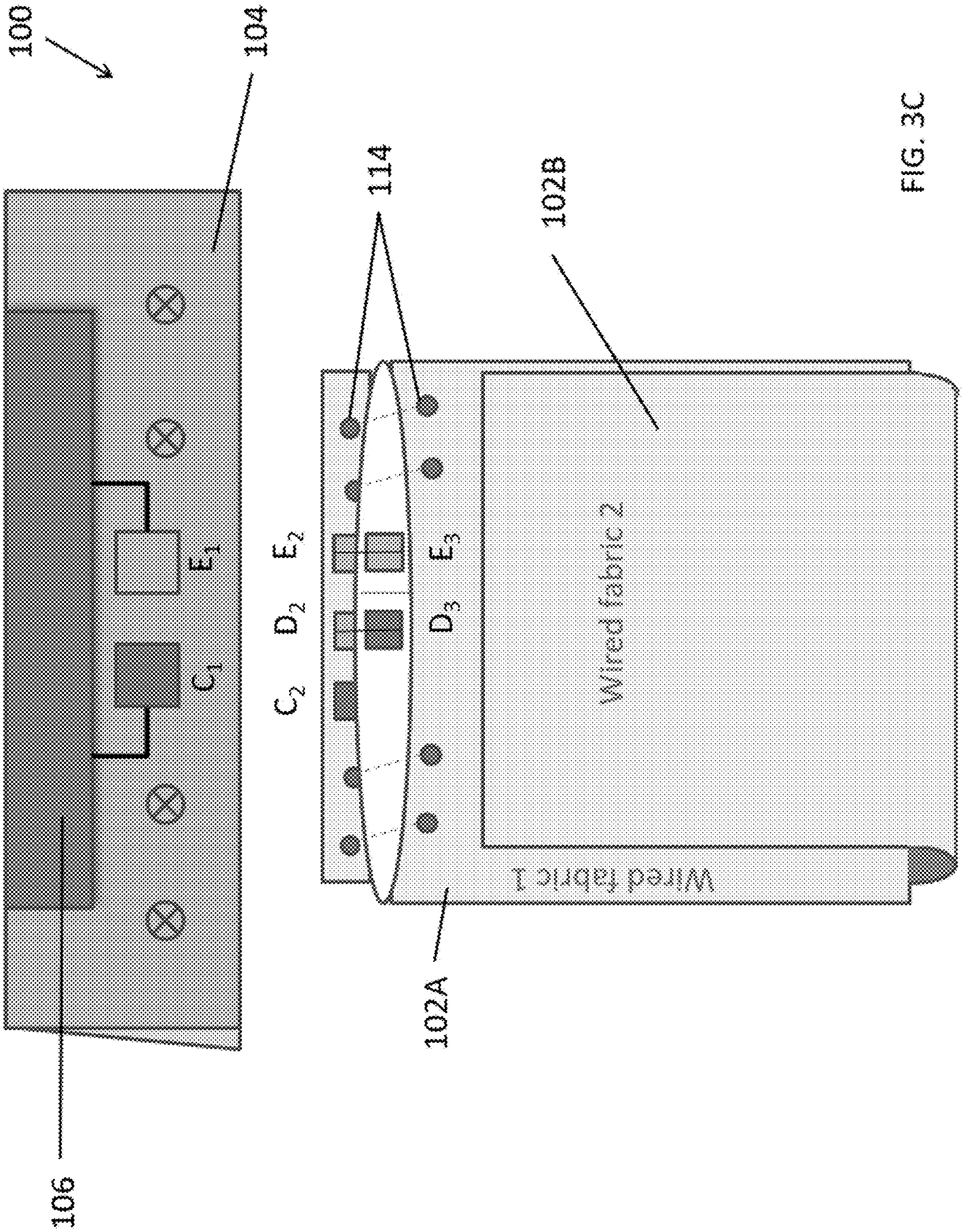
FIG. 3C is a schematic diagram showing the container body produced by combining the two sheets of fabric in FIGS. 3A and 3B.

With reference to FIGS. 3A to 3C, the container or the bag 102 is made by two pieces of material sheets, preferably two pieces of fabric each provided with the electrical wire 116 routed to cover a substantial portion of the fabric material. In this example, the bag 102 is defined by a first sheet of fabric 102A wrapping around two opposite side portions of the body of the container 102 as shown in FIG. 3A, and a second sheet of fabric 102B wrapping around a bottom portion of the body of the container 102 as shown in FIG. 3B, and the two sheets of fabric are combined to form the container 102 with an opening defined at a top portion of the body of the container 102 as shown in FIG. 3C.

Preferably, the anti-tampering arrangement includes a first electrical wire 116A defining a first group of parallel sections arranged in a first direction defined on the first sheet of fabric 102A. Since the electrical wire runs through both the front and the back when the sheet of fabric is folded into two halves, the integrity of the front, the back as well as the left and right sides/edges of the bag 102 are protected from tampering.

In addition, the anti-tampering arrangement includes a second electrical wire 116B defining a second group of parallel sections arranged in a second direction different from the first direction, and the wire 116B is provided on the second sheet of fabric 102B. Preferably, when the two sheets of fabric overlap with each other, the first group of parallel sections at least partially intersects with the second group of parallel sections, more preferably, the two groups of sections combine to define a cross pattern to further enhance the anti-tampering function of the bag 102, by safeguarding cutting in all possible directions.

Furthermore, the electrical wire 116B embedded in the second sheet of fabric 102B runs through both the front and the back when the sheet of fabric is folded into two halves, the integrity of the front, the back as well as the bottom of the bag 102 are protected from tampering.

Optionally, the container 102 further comprising one or more insulating layers 118 sandwiched between the first sheet of fabric 102A and the second sheet of fabric 102B, so as to electrically isolate the two wires. Alternatively, the wires may be protected by insulating sleeves such that insulating layers may not be necessary.

With reference to FIG. 3C, the detection module 106 electrically connects to a plurality of terminals of the electrical wires on the fabric sheets, at around the top portion or the opening of the bag 102. Preferably, the serial connection may be arranged as follows:

(1) the first terminal $C_1$ of the detection module 106 is directly connected to the first terminal $C_2$ of the second sheet of fabric 102B;

(2) the first terminal $C_2$ of the second sheet of fabric 102B is connected to the second terminal $D_2$ of the second sheet of fabric 102B via the second electrical wire 116B embedded in the fabric;

(3) the second terminal $D_2$ of the second sheet of fabric 102B is directly connected to the first terminal $D_3$ of the first sheet of fabric 102A;

(4) the first terminal $D_3$ of the first sheet of fabric 102A is connected to the second terminal $E_3$ of the first sheet of fabric 102A via the first electrical wire 116A embedded in the fabric; and (5) the second terminal $E_3$ of the first sheet of fabric 102A is connected to the second terminal $E_1$ of the detection module 106, either directly or indirectly through a third terminal $E_2$ on the second sheet of fabric 102B.

As appreciated by a skilled person in the art, the wire routing, positions of the terminals and the serial connection arrangement may be modified if necessary.

In addition, the detection module 106 may further comprise a communication module (not shown) arrange to provide a notification of the tampering being detected. For example, a notification of tampering may be provided to an owner/recipient or courier/security service provider using mobile or web applications accessible by a computing device such as a smartphone or a mobile terminal. Preferably, a Bluetooth communication module such as a BLE (Bluetooth Low-Energy) beacon may be included in the detection module 106, and the BLE beacon may communicate with an external BLE reader arranged to monitor the status of the container as desired.

To use the anti-tampering container 100, item(s) may be placed inside the anti-tampering bag 100 which may be locked by the BLE locking plates 104 and secured by the locking pins 112. The item(s) will be secured since cutting of the safe-bag 102 and opening of the BLE locking plates 104 will be sensed by the BLE beacon 106. In case of tampering, the BLE beacon 106 will send out an alert data via BLE communication which is picked up by the BLE reader (not shown), and a notification of the tampering may be provided accordingly.

These embodiments of the present invention provides reusable yet secure safe-bag to store the item(s), locked securely by locking plates whose open/closed condition is sensed by the BLE beacon and monitored by a BLE reader at the vicinity. The BLE locked safe-bag can overcome the inadequacy of the trivial security protection by simple container-covering/sealing solutions.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An anti-tampering container comprising:

a container arranged to contain an object;

an enclosure arranged to lock and seal the container in an enclosed state so as to prevent an access of the object contained in the container; and a detection module including an anti-tampering arrangement arranged to detect tampering of the enclosed state of the container, and to provide a notification of the tampering being detected, characterized in that:

the anti-tampering arrangement comprises an electrical circuit in connection with the detection module, the anti-tampering arrangement includes an electrical conductive member disposed on a substantial portion of a body of the container, the electrical conductive member includes at least one electrical wire embedded or attached to the body of the container, the container comprises at least a first sheet of material and a second sheet of material defining the body of the container, wherein the first sheet of material wraps around two opposite side portions of the body of the container and the second sheet of material wraps around a bottom portion of the body of the container such that the first sheet of material and the second sheet of material are overlapped in a front surface and a rear surface of the body of the container and combined to form the container with an opening defined at a top portion of the body of the container, and the at least one electrical wire includes a first electrical wire defining a first group of parallel sections arranged in a first direction defined on the first sheet of material, and a second electrical wire defining a second group of parallel sections arranged in a second direction defined on the second sheet of material, wherein the two sheets of material overlap with each other such that the first group of parallel sections at least partially intersects with the second group of parallel sections.

2. The anti-tampering container in accordance with claim 1, wherein the anti-tampering arrangement includes an electrical switch in connection with the electrical circuit, and wherein the electrical switch is arranged to be actuated by the enclosure.

3. The anti-tampering container in accordance with claim 2, wherein the detection module is arranged to detect tampering of the enclosed state by detecting a change of state of the electrical switch.

4. The anti-tampering container in accordance with claim 2, wherein the enclosure includes a closable flap connected to the container, and wherein the closable flap depresses the electrical switch when the container is in the enclosed state.

5. The anti-tampering container in accordance with claim 4, wherein the enclosure further includes a securing means arranged to secure the position of the closable flap when the container is in the enclosed state.

6. The anti-tampering container in accordance with claim 5, wherein the securing means includes at least one locking pin.

7. The anti-tampering container in accordance with claim 1, wherein the electrical conductive member is arranged to form at least partially the electrical circuit.

8. The anti-tampering container in accordance with claim 1, wherein the detection module is arranged to detect tampering of the enclosed state by detecting a change of state of the electrical conductive member.

9. The anti-tampering container in accordance with claim 8, wherein the change of state of the electrical conductive member includes a change of electrical connectivity of the electrical conductive member.

10. The anti-tampering container in accordance with claim 8, wherein the change of state of the electrical conductive member includes a change of electrical parameter of the electrical conductive member.

11. The anti-tampering container in accordance with claim 1, wherein the at least one electrical wire is arranged to form at least one electrical conductive path.

12. The anti-tampering container in accordance with claim 11, wherein the detection module is arranged to connect to a single electrical conductive path defined by a plurality of electrical wires.

13. The anti-tampering container in accordance with claim 12, wherein the first group of parallel sections covers at least one surface defined on the body of the container.

14. The anti-tampering container in accordance with claim 13, wherein the second direction is different from the first direction, and the second group of parallel sections covers the at least one surface defined on the body of the container.

15. The anti-tampering container in accordance with claim 14, wherein the first electrical wire and the second electrical wire are electrically connected in series.

16. The anti-tampering container in accordance with claim 1, wherein the first group of parallel sections and the second group of parallel sections combine to define a cross pattern.

17. The anti-tampering container in accordance with claim 1, wherein the first group of parallel sections are electrically isolated from the second group of parallel sections at the intersections defined by the first electrical wire and the second electrical wire.

18. The anti-tampering container in accordance with claim 1, wherein the detection module electrically connects to a plurality of terminals of the at least one electrical wire.

19. The anti-tampering container in accordance with claim 1, wherein the detection module comprises a communication module arrange to provide a notification of the tampering being detected.

20. The anti-tampering container in accordance with claim 19, wherein the communication module includes a Bluetooth communication module.

21. The anti-tampering container in accordance with claim 20, wherein the communication module includes a BLE beacon.

22. The anti-tampering container in accordance with claim 21, further comprising an external BLE reader arranged to monitor a status of the container.

23. The anti-tampering container in accordance with claim 1, wherein the first sheet of material is a first sheet of fabric and the second sheet of material is a second sheet of fabric.

24. The anti-tampering container in accordance with claim 23, the container further comprising an insulating layer sandwiched between the first sheet of fabric and the second sheet of fabric.

25. The anti-tampering container in accordance with claim 23, wherein the enclosure is arranged to close an opening defined at a top portion of the body of the container so as to seal the container.

26. The anti-tampering container in accordance with claim 23, wherein the container is a bag.

27. The anti-tampering container in accordance with claim 26, wherein the detection module is fixedly connected to the enclosure.

* * * * *